United States Patent
Alhussan (10) Patent No.: US 10,371,121 B1
(45) Date of Patent: Aug. 6, 2019

(54) WIND TURBINE BLADE WITH A PASSIVE POROUS MEDIUM FOR FLOW SEPARATION CONTROL

(71) Applicant: Khaled Abdullah Alhussan, Riyadh (SA)

(72) Inventor: Khaled Abdullah Alhussan, Riyadh (SA)

(*) Notice: Subject to any disclaimer, the term of this patent is extended or adjusted under 35 U.S.C. 154(b) by 310 days.

(21) Appl. No.: 15/437,965

(22) Filed: Feb. 21, 2017

(51) Int. Cl.
    *F03D 1/06* (2006.01)

(52) U.S. Cl.
    CPC ...... *F03D 1/0675* (2013.01); *F05B 2240/221* (2013.01); *F05B 2260/60* (2013.01)

(58) Field of Classification Search
    CPC ........ F03D 1/0675; F03D 7/022; F03D 7/024; F05D 2240/306
    See application file for complete search history.

(56) References Cited

U.S. PATENT DOCUMENTS

| | | | | |
|---|---|---|---|---|
| 7,354,247 B2* | 4/2008 | Bonnet | ................ | F03D 1/0633 415/905 |
| 7,387,491 B2* | 6/2008 | Saddoughi | ............ | F03D 1/0608 415/914 |
| 7,931,445 B2* | 4/2011 | Haans | ................... | F03D 1/0608 416/1 |
| 8,016,560 B2* | 9/2011 | McGrath | ............... | F03D 1/0633 416/231 B |
| 8,382,043 B1* | 2/2013 | Raghu | ..................... | B64C 21/04 244/1 N |

* cited by examiner

*Primary Examiner* — Ninh H. Nguyen
(74) *Attorney, Agent, or Firm* — Eldredge Law Firm, LLC; Richard Eldredge; Beth Felix (57) ABSTRACT

A combination of a wind turbine blade with a flow separation control. The wind turbine blade includes a body with an upper surface and a lower surface that extend from a leading edge to a trailing edge. The flow separation control device includes a plurality of openings on the upper surface of the body.

11 Claims, 10 Drawing Sheets

WIND TURBINE BLADE WITH A PASSIVE POROUS MEDIUM FOR FLOW SEPARATION CONTROL

BACKGROUND

1. Field of the Invention

The present invention relates generally to wind turbine blades. More specifically, the present invention is related to a system and method to passively control flow separation utilizing a passive porous medium for flow separation control. The porous medium is configured to reduce, if not eliminate, the boundary layer separation near the trailing edge of the wind turbine blades.

2. Description of Related Art

Figure 1:
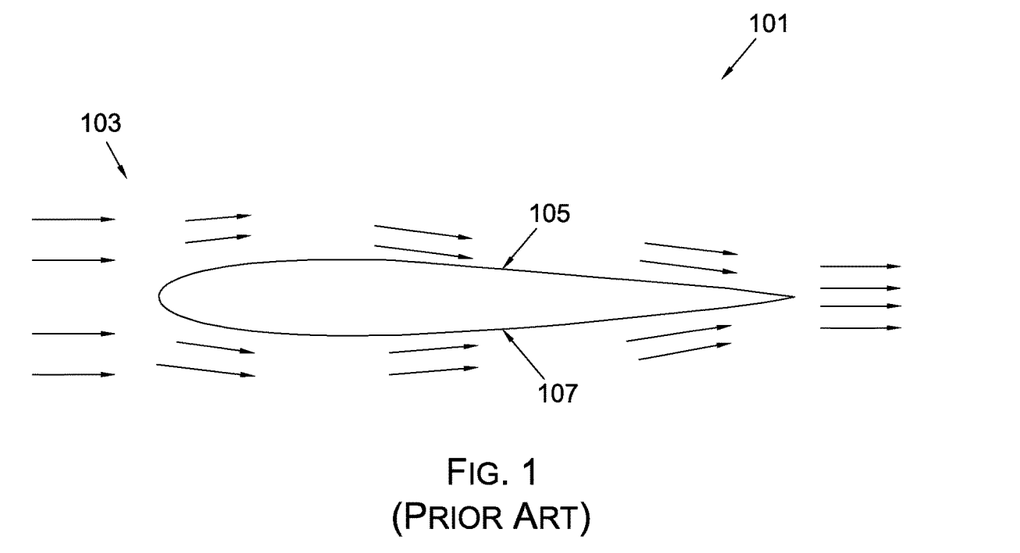
FIG. 1 is a side view of a conventional wind turbine blade disposed within an airstream.

Wind turbine blades are well known in the art and are effective means to manipulated gas and/or fluid within an airstream. In one embodiment, the wind turbine blade is utilized to rotate an electric turbine, which in turn creates electrical power. FIG. 1 depicts a simplified cross-sectional side view of a wind turbine blade 101 traveling through an airstream 103 that passes over a top surface 105 and bottom surface 107 of wind turbine blade 101.

Figure 2:
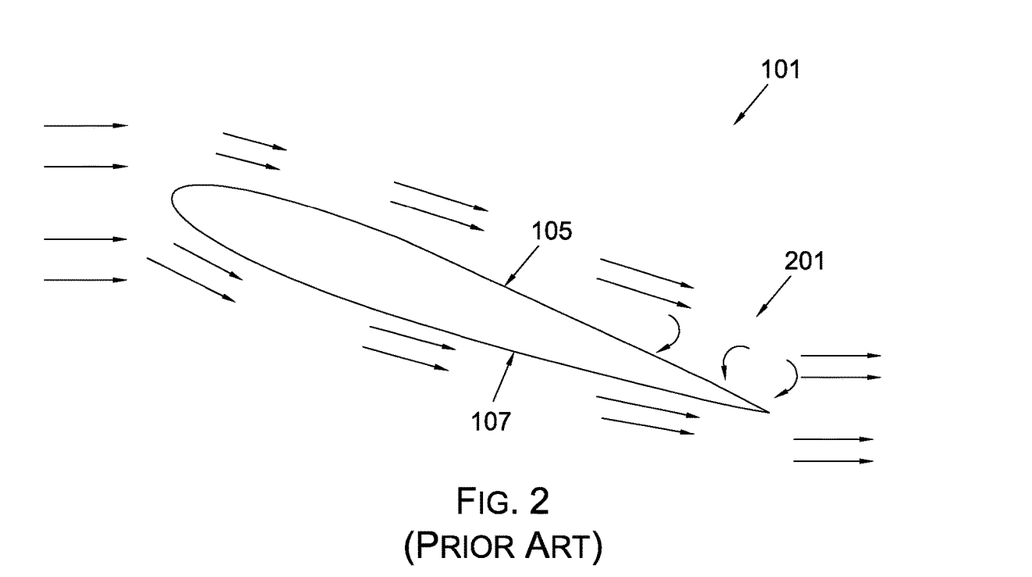
FIG. 2 is the wind turbine blade of FIG. 1 with flow separation developing at the trailing edge of the blade.

One of the problems commonly associated with wind turbine blade 101 is the limited use during different wind speeds. For example, FIG. 2 depicts a common problem associated with wind turbine blade 101 during use; specifically, flow separation 201 can occur near the trailing edge of the wind turbine blade 101 during different types of airstreams. It should be understood that flow separation 201 greatly reduces the efficiency of the wind turbine blade, which in turn could result in loss in power output created by the wind turbine.

It is therefore desired to utilize a passive porous means to control the flow separation over the wind turbine blade. Accordingly, although great strides have been made in the area of wind turbine blades, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional wind turbine blades. Specifically, the present invention is related to a system and method to control flow separation utilizing a method of injecting fluid and/or gas into a separated boundary layer to reduce, if not eliminate, the boundary layer separation near the trailing edge of the wind turbine blade during use. This feature is achieved by channeling fluid and/or gas through a porous membrane on the top surface of the wind turbine blade, wherein the flow separation device is positioned at a location along the chord of the wind turbine blade to inject fluid and/or gas into and/or near the separated boundary layer that develops near the trailing edge of the wind turbine blade. In one preferred embodiment, the fluid and/or gas is channeled through a plurality of capillary tubes extending through the skin of the wind turbine blade. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 3-10 depict various views of a wind turbine blade 301 and flow control device 309 in accordance with one preferred embodiment of the present application. It will be appreciated that wind turbine blade 301 overcomes one of more of the above-listed problems commonly associated with conventional wind turbine blades. In the preferred embodiment, the system and method of use is directed to a wind turbine blade 301; however, it will be appreciated that the teachings discussed herein could be utilized with other types of blades and should not be narrowly tailored for wind turbine blades. For example, the features discussed herein could also be utilized with airfoils, compressor blades, turbine blades, and the like.

Figure 3:
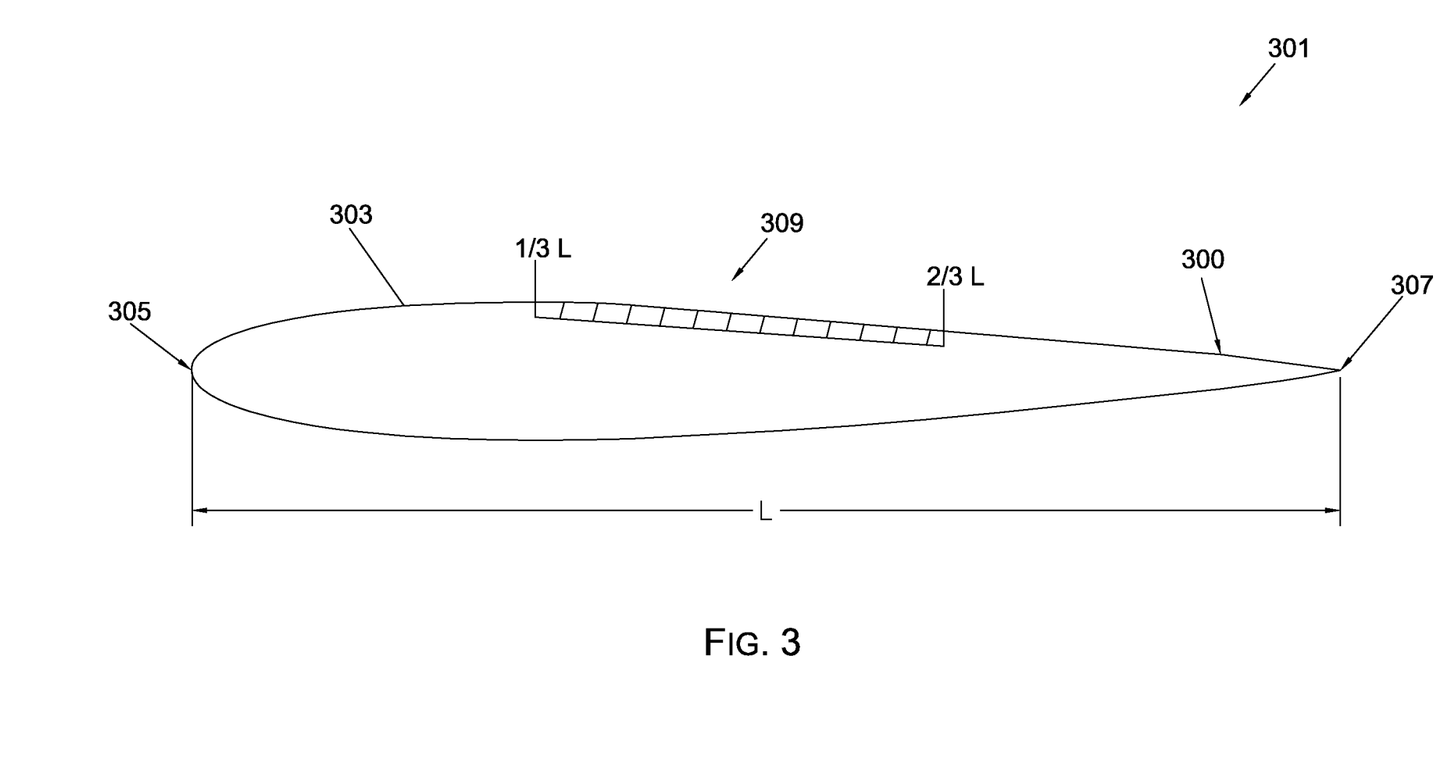
FIG. 3 is a side view of a wind turbine blade with a flow control device in accordance with a preferred embodiment of the present application.

In the contemplated embodiment, wind turbine blade 301 includes one or more of a contoured body 303 having an upper surface 300 and a lower surface 302 that extends from a leading edge 305 to a trailing edge 307.

Figure 4A:
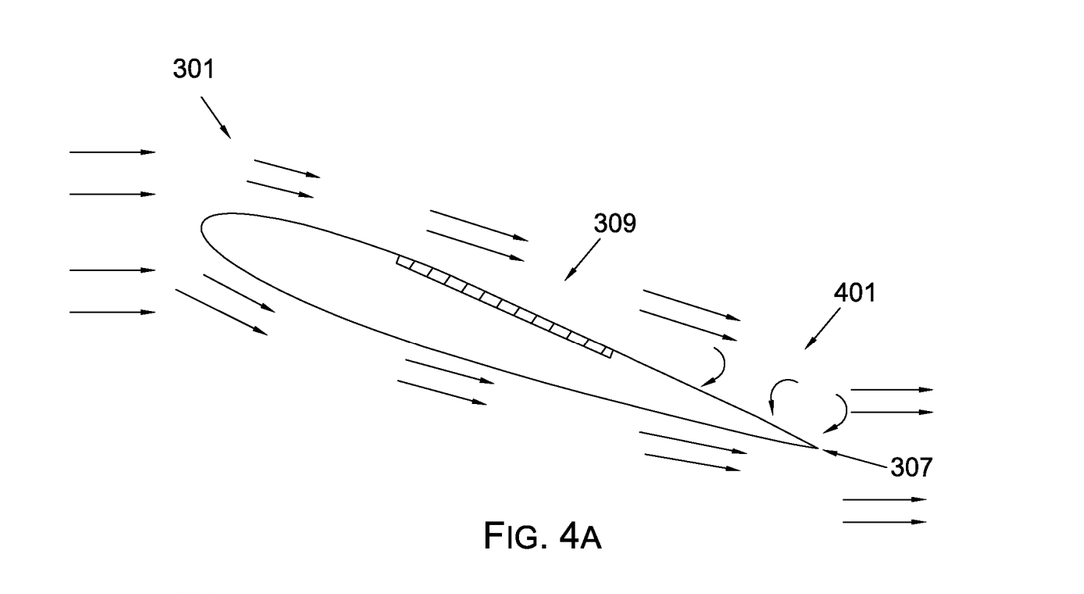
FIGS. 4A and 4B are side views of the wind turbine blade of FIG. 3 during use.
Figure 4B:
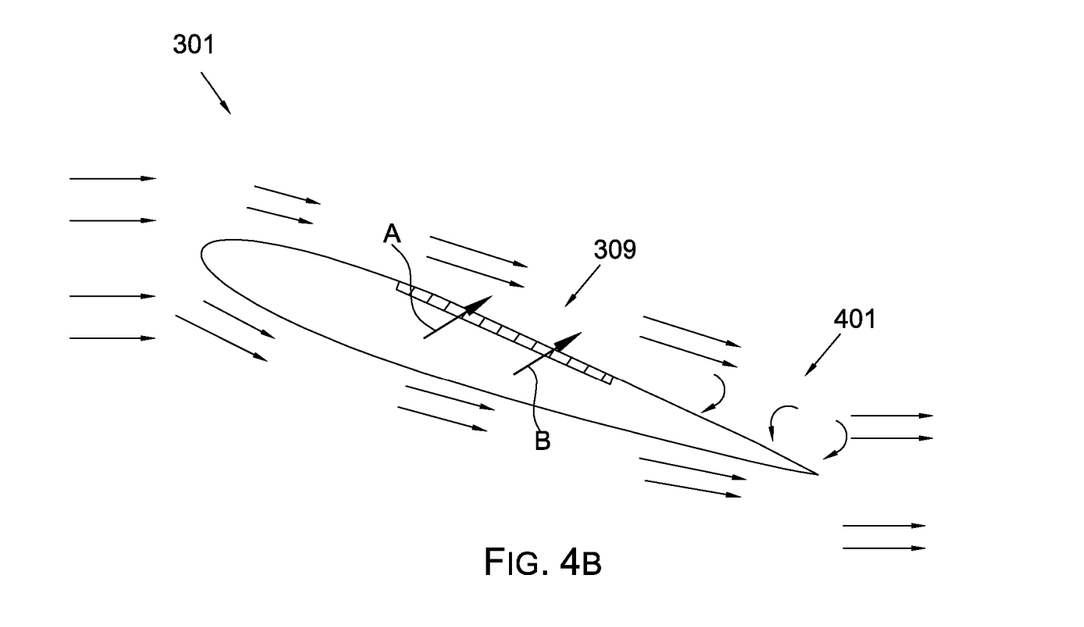

One of the unique features believed characteristic of the present invention is the use of a separation flow control device 309 configured to manipulated the airflow around the upper surface 300, as depicted in FIGS. 4A and 4B. To achieve this feature, the flow control device 309 is configured to inject air and/or fluid within the airstream passing over the upper surface 300, as depicted with arrow "A" and "B" of FIG. 4B. It should be understood that the process of injecting the fluid and/or air into the turbulent flow separation 401 causes the separated boundary layer to partially, if not fully, reattach to the upper surface 300, which in turn increases the wind turbine blade efficiency during use.

Referring back to FIG. 3, it has been found that the porous section of the flow control device 309 extends from ⅓ to ⅔ of the chord length, as indicated by "⅓L" and "⅔L," respectively. Within this confined area, fluid and/or gas is injected into the airstream passing over the upper surface 300 as discussed above. Although found effective within this section of the chord length, it will be appreciated that other embodiments could include sections with different chord lengths.

Figure 5:
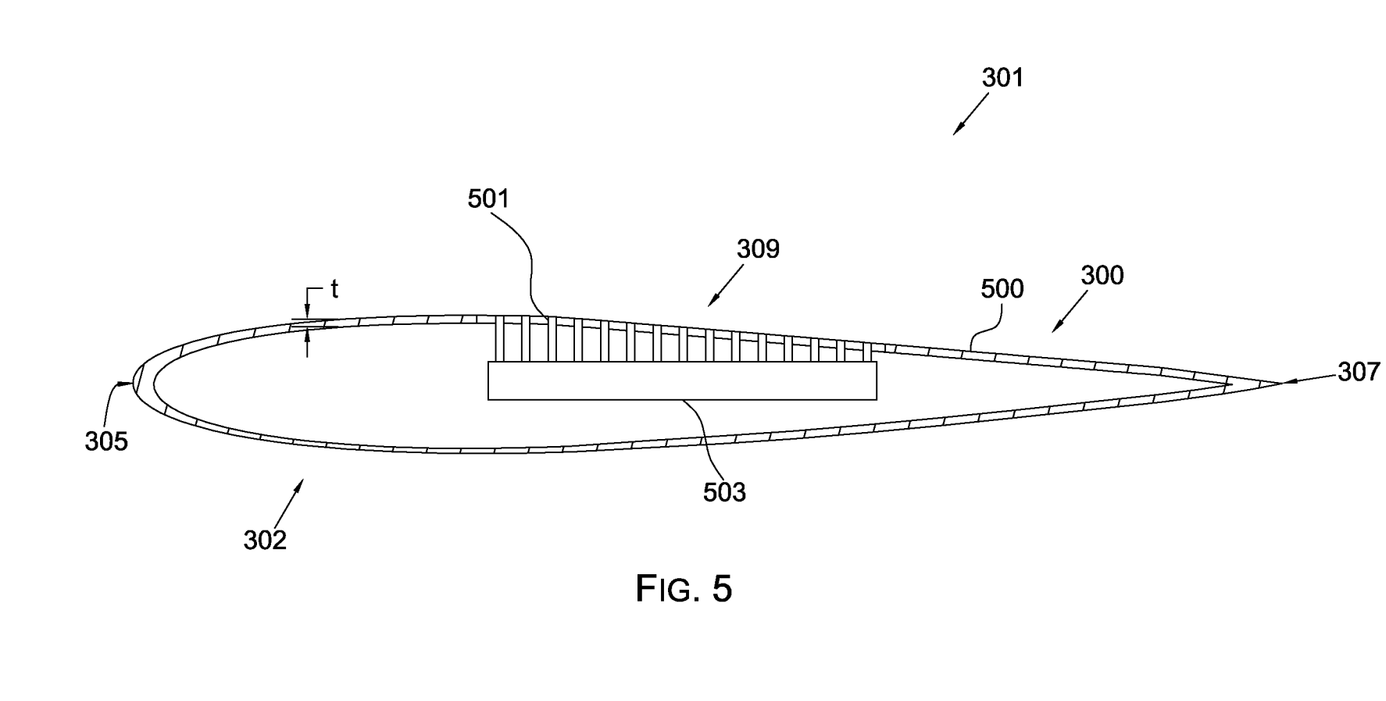
FIG. 5 is a side cross-sectional view of the wind turbine blade of FIG. 3.
Figure 6:
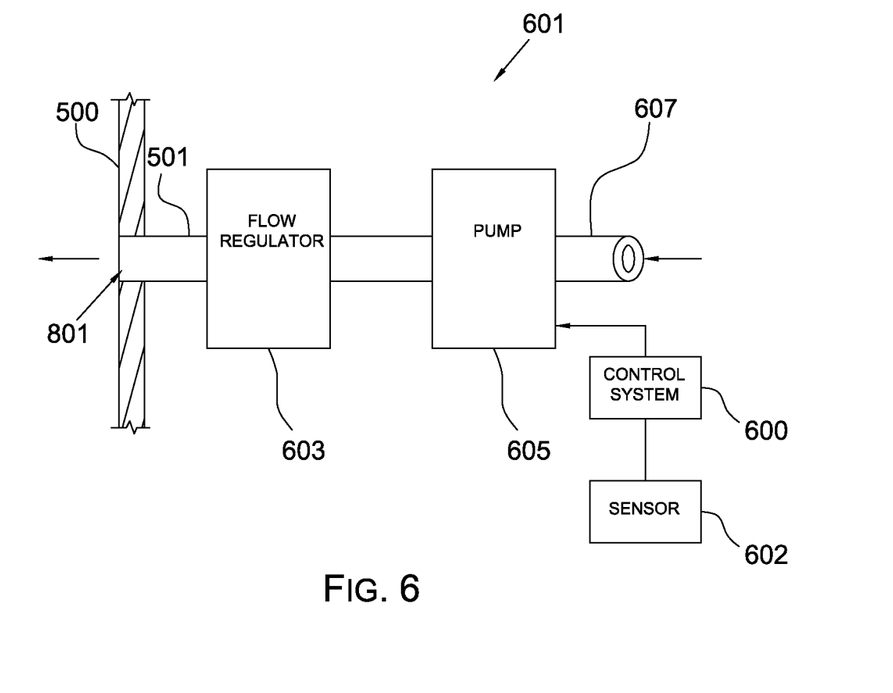
FIG. 6 is a simplified schematic of the flow control device of FIG. 3.

In FIGS. 5 and 6, respective cross-sectional and simplified schematics of the wind turbine blade and flow control device are shown. In one preferred embodiment, the control device 309 could include a plurality of capillary tubes 501 that extend through the thickness "t" of the skin 500 of the wind turbine blade. The tubes 501 are in gaseous and/or fluid communication with a common gas or fluid reservoir 503. As depicted in FIG. 6, the plurality of capillary tubes include an opening 801 that can either remain flush with or extend from upper surface 300. Although depicted extending relatively perpendicular to the skin, it will be appreciated that the capillary tubes could be oriented at an angle relative to the skin surface. This feature would inject the fluid and/or gas at an angle relative to the skin surface to further reduce the flow separation during different flight regimes.

The flow control device 309 could include an injection system 601 having one or more of a pump 605, and/or similar means, configured to channel fluid and/or gas through an inlet tube 607 to a flow regulator 603. The flow regulator 603 is regulates the amount of fluid and/or gas channeled through the capillary tubes 501.

In one embodiment, the inlet tube 607 could be in fluid and/or gaseous communication with the airstream passing at a different location around the wind turbine blade and/or the wind turbine assembly. This feature is shown in FIG. 9, wherein a side view of the wind turbine blade is shown with tube 607 ending at the lower surface 302.

Figure 9:
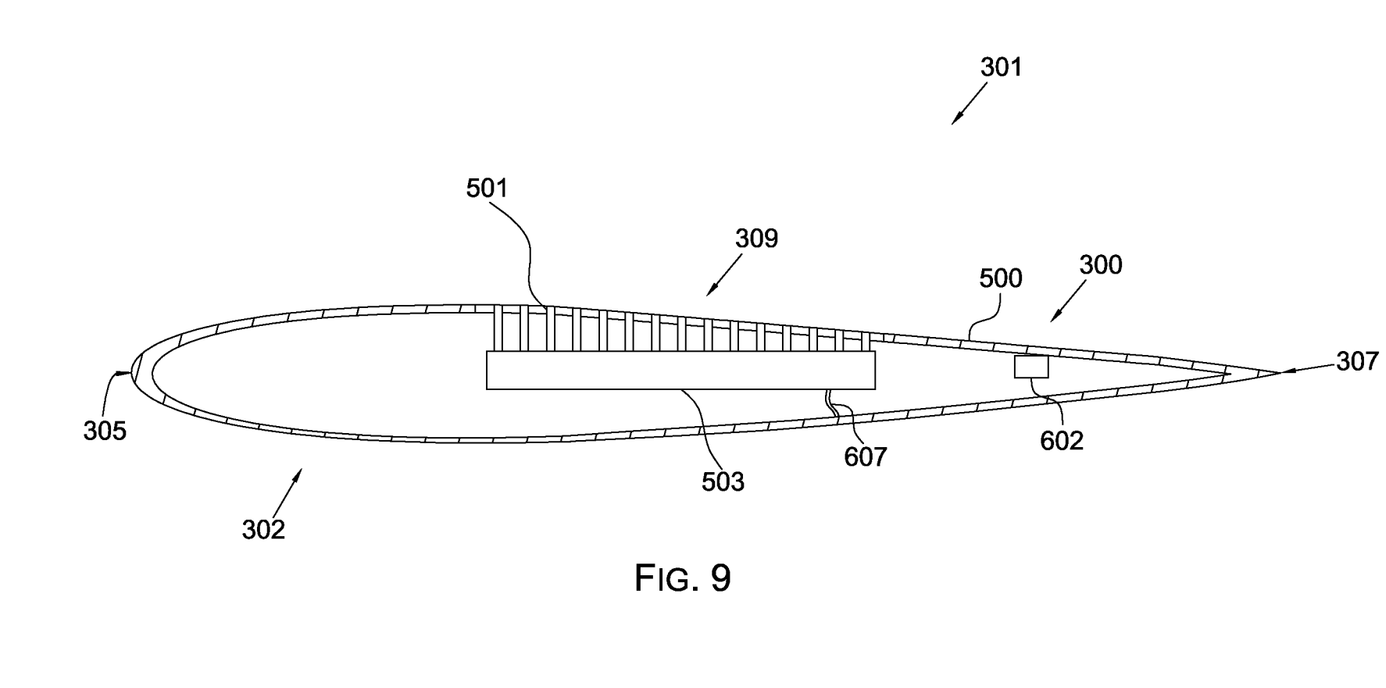
FIG. 9 is a side view of an alternative embodiment of the wind turbine blade of FIG. 3.

Further, as depicted in FIGS. 6 and 9, a sensor 600 and a computer device 602 could also be in data communication with the injection system 601 for sensing flow separation 401 and regulating the flow rate of fluid and/or gas passing through capillary tube 501. For example, a larger flow separation 401 could require a greater flow rate of fluid and/or gas passing through the capillary tubes than a smaller flow separation 401. Accordingly, the system 601 provides effective means for flow separation control, and in some embodiments could provide autonomous control of the boundary layer separation. In the exemplary embodiment, the sensor is position on the upper surface of the wind turbine blade near the flow separation area; however, it will be appreciated that the sensor could be positioned at various locations and should not be limited to the illustrated location.

Figure 7:
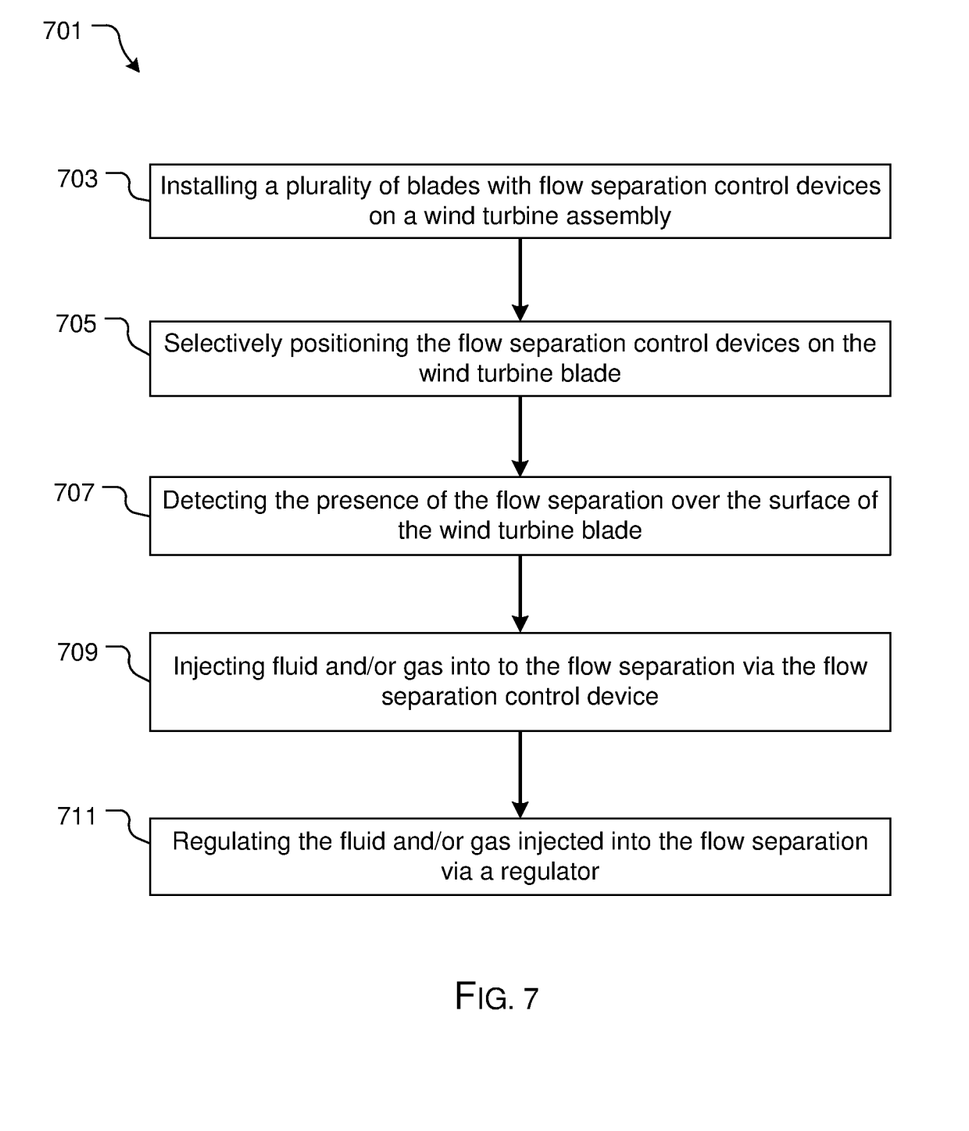
FIG. 7 is a flowchart depicting the preferred method of use.

In FIG. 7, a flowchart 701 depicting the preferred method of use is shown. During operation, the flow separation control devices are manufactured with the wind turbine blades at selected locations and installed on a wind turbine assembly. In one embodiment, the control devices are utilized as passive means to control the flow separation. Likewise, the control devices could be utilized as active means to control the flow separation by injecting fluid and/or gas into the separated boundary layer at selective locations along the blade. The process could also include the feature of autonomously controlling the flow separation with a system configured to sense the flow separation and thereafter injected a desired amount of fluid and/or gas in the airstream via a regulator. These unique features are outlined in boxes 703-707.

Figure 8:
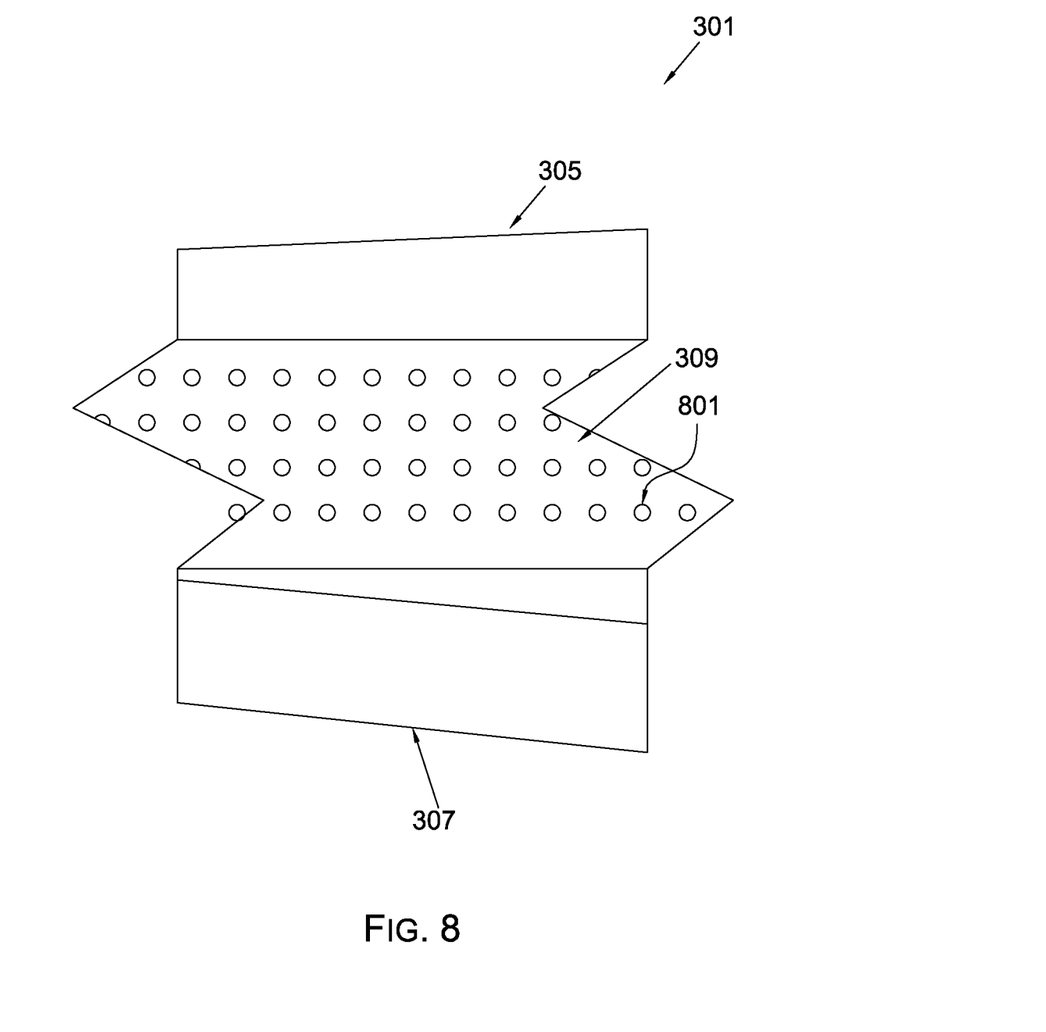
FIG. 8 is a partial enlarged view of the wind turbine blade of FIG. 3.
Figure 10:
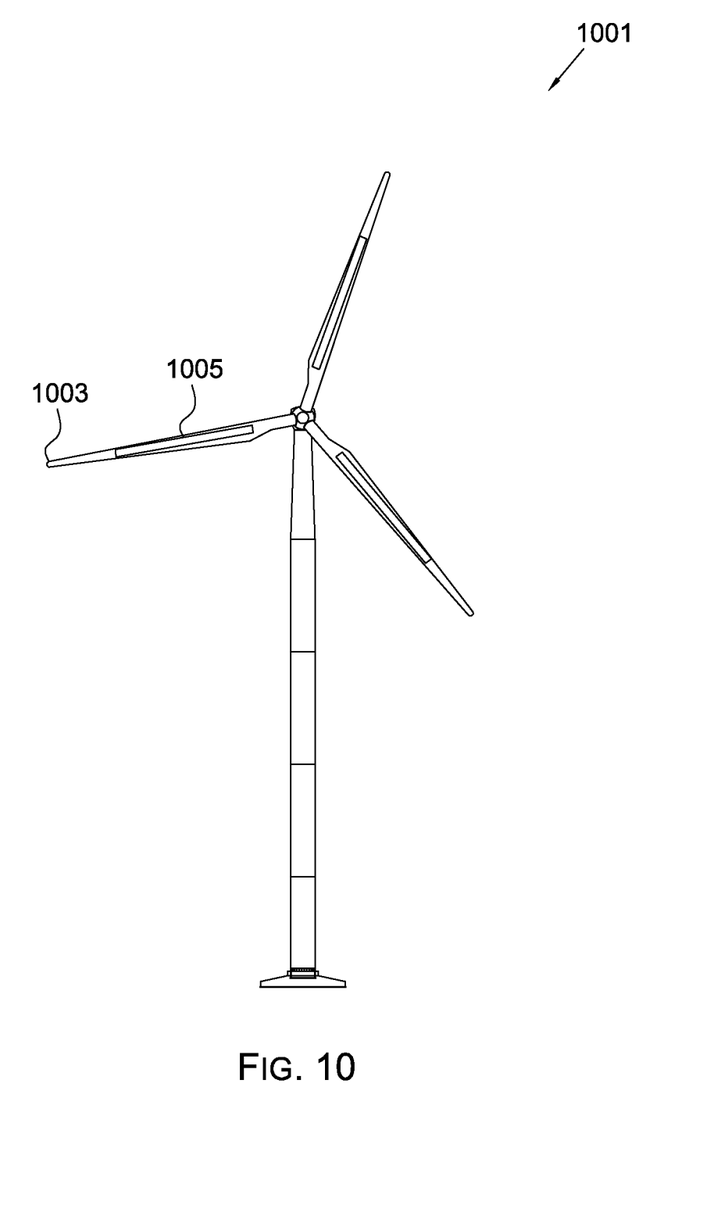
FIG. 10 is a front view of a wind turbine utilizing the wind turbine blade of FIG. 3.

Referring now to FIGS. 8 and 9, a plurality of openings 801 extend through the skin of the wind turbine blade. The number of opening and associated capillary tubes are a design choice along with the diameter size of each tube. In FIG. 10, a front view of the wind turbine 1001 is shown having blades 1003 with flow separation control device 1005. It will be appreciated that the wind turbine utilizes the features of the blade and associated flow separation control devices discussed above and incorporates the same.

Figure 11:
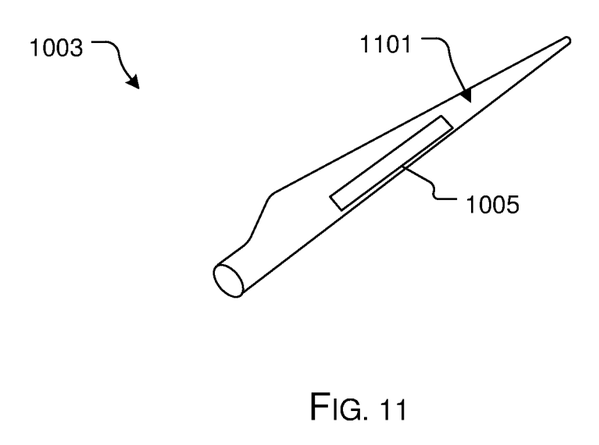
FIG. 11 is an oblique view of the wind turbine blade of FIG. 10.
Figure 12A:
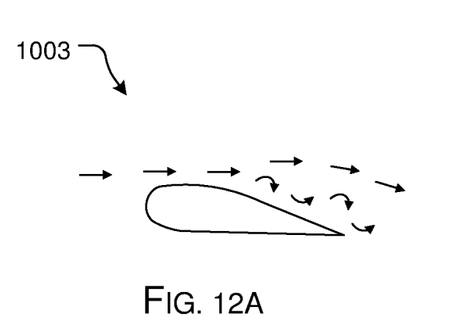
FIGS. 12A and 12B are side views of the wind turbine blade of FIG. 11.
Figure 12B:
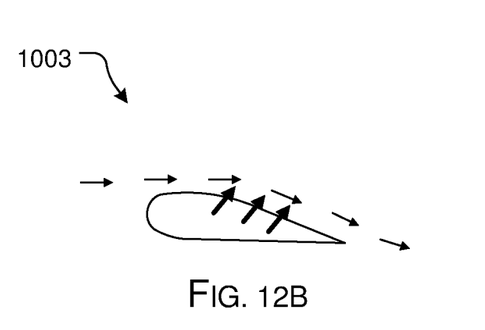

The features of the present invention are more fully illustrated in FIGS. 11, 12A, and 12B of the drawings, wherein the wind turbine blade 1003 is shown having the control device 1005 secured to an upper surface 1101 of the blade and configured to reduce flow separation of the airstream passing over the surface 1101. In FIG. 12A, the boundary layer of the airstream separates from the upper surface 1101, which in turn causes a turbulent region near the trailing edge of the wind turbine blade. As the flow separation control device 1005 is activated, the boundary layer reattaches to the upper surface 1101, as depicted in FIG. 12B. In the preferred embodiment, the system utilizes a passive flow separation control device to passively control the flow separation over the wind turbine blades; however it will be appreciated that alternative embodiments could utilize active control means.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A combination of a wind turbine blade and a passive flow separation control device, comprising:
   the wind turbine blade, having:
      a body with an upper surface and a lower surface that extend from a leading edge to a trailing edge, the upper surface is on an opposing side of the body than the lower surface; and
   the flow separation control device, having:
      a plurality of openings on the upper surface of the body;
      an inlet tube in fluid communication with an airstream passing over the lower surface of the body, the inlet tube extending from the lower surface to the plurality of openings on the upper surface of the body;
      a sensor disposed within the body and configured to sense flow separation near the trailing edge of the body;
      a pump disposed within the body and configured to direct air from the airstream passing over the lower surface to the airstream passing over the upper surface via the inlet tube and plurality of openings; and
      a flow regulator in gaseous communication with the pump, the flow regulator is configured to a flow of the air from the inlet tube to the plurality of openings;
      wherein a portion of the airstream passing over the upper surface of the body is affected by the plurality of openings; and
      wherein the plurality of openings reduces a flow separation in the portion of the airstream passing over the upper surface of the body.

2. The combination of claim 1, wherein the flow separation device extends the longitudinal length of the wind turbine blade.

3. The combination of claim 2, wherein the plurality of openings extend from a ⅓ chord length to a ⅔ chord length of the wind turbine blade.

4. The combination of claim 1, wherein the plurality of openings having a circular shaped dimension.

5. The combination of claim 1, wherein the plurality of openings extend from a ⅓ chord length to a ⅔ chord length of the wind turbine blade.

6. The combination of claim 1, wherein the plurality of openings are in gaseous communication with a capillary tube extending through a thickness of the body.

7. The combination of claim 6, wherein gas is channeled through the capillary tube and passes through the opening into the airstream.

8. The combination of claim 7, wherein the capillary tube is oriented at an angle relative to the upper surface of the body.

9. The combination of claim 8, wherein the gas exits at an angle relative to the upper surface of the body.

10. The combination of claim 1, further comprising:
    a common air chamber in gaseous communication with a plurality of capillary tubes extending through the thickness of the body and in gaseous communication with the pump, the common air chamber is disposed within the body.

11. The combination of claim 10, wherein the plurality of capillary tubes extend from a ⅓ chord length to a ⅔ chord length of the wind turbine blade.

* * * * *